(12) United States Patent
Faivre

(10) Patent No.: US 8,521,371 B2
(45) Date of Patent: Aug. 27, 2013

(54) SYSTEMS AND METHODS FOR REMAPPING OF MACHINE IMPLEMENT CONTROLS

(75) Inventor: Joseph Leo Faivre, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 321 days.

(21) Appl. No.: 12/976,644

(22) Filed: Dec. 22, 2010

(65) Prior Publication Data
US 2012/0165962 A1    Jun. 28, 2012

(51) Int. Cl.
*G06F 19/00*    (2011.01)
(52) U.S. Cl.
USPC ............................................................ 701/50
(58) Field of Classification Search
USPC .................................................. 701/19, 50
See application file for complete search history.

(56) References Cited

U.S. PATENT DOCUMENTS

| | | | |
|---|---|---|---|
| 5,002,454 A | 3/1991 | Hadank et al. | |
| 5,918,527 A | 7/1999 | Haga et al. | |
| 6,140,787 A | 10/2000 | Lokhorst et al. | |
| 6,233,511 B1 | 5/2001 | Berger et al. | |
| 2006/0064221 A1* | 3/2006 | Sporer et al. | 701/50 |
| 2009/0198382 A1 | 8/2009 | Koch et al. | |

* cited by examiner

*Primary Examiner* — Kim T Nguyen
(74) *Attorney, Agent, or Firm* — Finnegan, Henderson, Farabow, Garrett & Dunner LLP

(57) ABSTRACT

Systems and methods for selectively remapping implement control commands in a machine comprise receiving a first input command signal for controlling a plurality of actuators associated with the machine. The first input command signal is associated with controlling a first work tool such that each of the plurality of actuators is independently controllable by one or more implement controllers. A current work tool attached to the machine is identified and compared with a first work tool. If the current work tool is different from the first work tool, the first input command signal is transformed into a second input command signal associated with the current work tool and provided to a plurality of actuators of the machine. The second input command signal is associated with controlling the current work tool such that less than each of the plurality of actuators is independently controllable by the one or more implement controllers.

20 Claims, 5 Drawing Sheets

SYSTEMS AND METHODS FOR REMAPPING OF MACHINE IMPLEMENT CONTROLS

TECHNICAL FIELD

The present disclosure relates generally to machine implement controllers and, more particularly, to systems and methods for selectively remapping machine implement controls.

BACKGROUND

Industrial, commercial, and construction environments often employ specialized machines and equipment, each of which is designed to support a small number of specific tasks associated with the environment. Due to the specialized nature of the equipment, it is not unusual for these environments to require the use of a variety of different machines, particularly when such environments involve comprehensive, turn-key projects that involve performing a large number of different tasks. For example, a road construction project may require a pneumatic or hydraulic hammer for demolishing existing surface material; an excavator with a bucket attachment for site clearing, digging, and grading; an augur drill for digging post holes for support structures; and a forklift for loading and unloading construction supplies from supply vehicles. Providing separate machines to perform each of these specialized tasks would be expensive and inefficient.

One solution for reducing the number of machines required to perform a large number of different tasks involves the adaptation of specialized tools for use with a single machine. For instance, specialized tools, such as hammers, buckets, auger bits, and forklift attachments, may be adapted with specialized connectors to interface with a hydraulic excavator or backhoe. As such, a single piece of equipment—in this case, the hydraulic excavator or backhoe—is rendered flexible enough to perform the tasks of four different machines. This, in turn, may reduce the need for four separate machines, thereby reducing overall project costs.

Increasing the flexibility of machines to interface with different attachments and implements does not come without costs. For example, each tool needs to be specifically designed to operate as an attachment to the specific machine to which it will interface. Furthermore, and perhaps more importantly, the different attachments are designed to perform different tasks, each of which may require different maneuverability goals and parameters. For instance, a hydraulic excavator is typically designed with two joysticks for independently controlling hydraulic actuators associated with boom lift, boom swing, movement of the stick, and movement (e.g., pivoting) of the attachment. For digging and grading operations, such independent control is effective for providing the operator with significant flexibility of movement of the bucket.

Such independent control, however, may become cumbersome and confusing for the operator if a forklift implement is attached to the machine. In particular, for loading and unloading operations using a forklift, it may be imperative that the plane defined by the forklift forks remains substantially parallel with the ground in order to prevent objects from falling from the forklift. In order to ensure that the forklift remains in the proper orientation, the operator may be required to carefully manually control the hydraulic actuators associated with the attachment as he or she raises and lowers the boom to the desired height. Such operation may be difficult and time-consuming for an operator, particularly one that is inexperienced at using multiple attachments on the machine.

Similar problems may arise when a hammer or auger tool is attached to the machine. For example, like the forklift, the hammer and auger tools may need to maintain a uniform orientation in order to effectively perform their respective tasks. In particular, the hammer and auger attachments generally need to maintain uniform movement in the direction of the tip of the tool. As with the forklift, in order to maintain this orientation, the operator may be required to carefully manually control the hydraulic actuator associated with the attachment as he or she raises and lowers the boom to the desired height.

One solution for increasing the probability that machine operators can correctly and proficiently manage machine controls for a variety of different tools and attachments is to significantly increase the amount of training required of machine operators. In addition to being costly, results of such an increase in operator training can vary dramatically, as different operators have different aptitudes for learning principles for controlling the machines.

Another potential solution for simplifying machine controllers involves automating certain commands and/or command responses to facilitate more predictable and logical control of a machine. For example, U.S. Pat. No. 6,233,511 ("the '511 patent"), which issued May 15, 2001 to Burger et al., describes electronic control for a two-axis implement that is purportedly configured to operate in a "coordinated mode." In the coordinated mode, a control system of the machine automatically controls the bucket of an excavator such that the bucket maintains the same orientation with respect to either the surface on which the vehicle is operating. According to the '511 patent, the system can also be controlled in an uncoordinated mode, which enables independent movement of the arm and bucket.

Although the system of the '511 patent may provide a system for selectively maintaining an orientation between the bucket and arm of a machine in certain situations, the system nonetheless has limited applicability. Specifically, although the system enables both coordinated and uncoordinated control of arm and attachment adjustment mechanisms, it does not provide selective remapping schemes for supporting selective remapping of machine control features for different attachment tools.

The presently disclosed systems and methods for versatile remapping of machine implement controls are directed toward overcoming one or more of the problems set forth above and/or other problems in the art.

SUMMARY

In accordance with one aspect, the present disclosure is directed to a method for selectively remapping implement control commands in a machine. The method may comprise receiving a first input command signal for controlling a plurality of actuators associated with the machine. The first input command signal may be associated with controlling a first work tool such that each of the plurality of actuators is independently controllable by one or more implement controllers. The method may also include identifying a current work tool attached to the machine, and determining whether the current work tool is different from a first work tool (e.g., the work tool that came equipped with machine). If the current work tool is different from the first work tool, the first input command signal may be transformed into a second input command signal associated with the current work tool. The second input command signal may be associated with controlling the current work tool such that less than each of the plurality of actuators is independently controllable by the one or more implement controllers. The second input command signal may be provided to one or more of the plurality of actuators of the machine. If, however, the current work tool is not different from the first work tool, the first input command signal may be provided to one or more of the plurality of actuators of the machine.

According to another aspect, the present disclosure is directed to a method for selectively remapping implement control commands in a machine. The method may comprise receiving an identification signal for identifying a current work tool attached to the machine and retrieving, from an on-board memory location, parameters for converting a first input command signal for controlling a plurality of actuators associated with the machine to a second input command signal for controlling the plurality of actuators. The first input command signal is associated with controlling a first work tool such that each of the plurality of actuators is independently controllable by one or more implement controllers. The second input command signal is associated with controlling the current work tool such that less than each of the plurality of actuators is independently controllable by the one or more implement controllers. The retrieved parameters may include an error correction parameter that adjusts the second input command signal based on an orientation of the current work tool with respect to a reference orientation. The method may also include updating, in memory associated with an implement controller, parameters for controlling the plurality of actuators based on the retrieved conversion parameters.

In accordance with yet another embodiment, the present disclosure is directed to a system for controlling a work tool associated with a machine. The system may comprise one or more actuators operatively coupled to the machine and configured to control movement associated with at least a portion of the machine. The system may also include a controller configured to receive a first input command signal for controlling the one or more actuators in a first coordinate system and a processor communicatively coupled to the controller. The process may be configured to receive an identification signal associated with a current work tool attached to the machine and determine whether the current work tool is different from a first work tool. If the current work tool is different from the first work tool, the processor may be further configured to transform the first input command signal into a second input command signal associated with the current work tool. The second input command signal may be associated with controlling the current work tool such that less than each of the plurality of actuators is independently controllable by the one or more implement controllers. The processor may also be configured to provide the second input command signal to one or more of the plurality of actuators of the machine. If, on the other hand, the current work tool is not different from the first work tool, the processor may be further configured to provide the first input command signal to one or more of the plurality of actuators of the machine.

DETAILED DESCRIPTION

Figure 1:
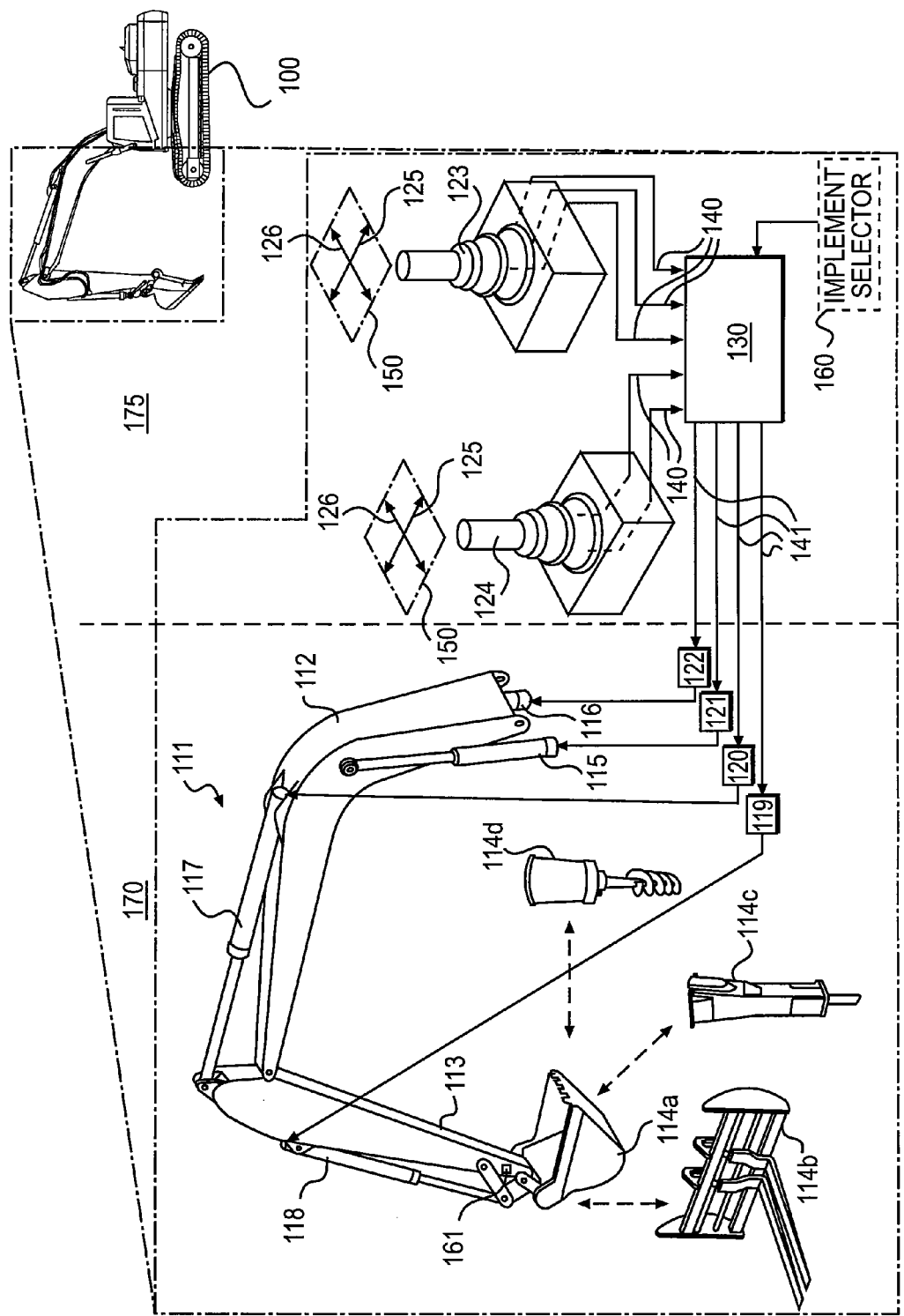
FIG. 1 provides a diagrammatic view of certain components for controlling movement of a machine implement, consistent with certain disclosed embodiments.

FIG. 1 provides a diagram illustrating certain components for manipulating a work tool 114$a$-114$d$ associated with a machine 100. Machine, as the term is used herein, refers to any type of machine that comprises an implement for manipulating one or more work tools 114$a$-114$d$. For example, machine 100 may include an excavator, a backhoe loader, a front shovel, a wheel loader, a grapple, and any other type of machine that manipulates an implement for performing one or more tasks. According to one embodiment, components for manipulating work tool 114$a$-114$d$ may include two subsystems: mechanical control subsystem 170 and operator interface and electronic control subsystem 175. It should be noted, however, that the names associated with, and the components contained within, these subsystems are provided solely for descriptive purposes, are exemplary only, and should not be considered to be limiting. For example, it is contemplated that certain components within each of mechanical control subsystem 170 and operator interface and electronic control subsystems 175 may include mechanical components, electrical components, or electro-mechanical components or any combination thereof.

Mechanical control subsystem 170 may generally include components that receive and process electrical control signals and control mechanical movement of one or more components associated with machine 100. For example, mechanical control subsystem 170 may include, among other things, linkage 111. According to one embodiment, linkage 111 may include a plurality of linkages such as a boom 112, a stick 113, and a work tool 114, such as bucket 114$a$. It should be noted, however, that the linkage configuration can differ from machine to machine, and the configuration may be modified to include a different work tool such as, for example, a forklift 114$b$, a hammer 114$c$, or an augur 114$d$. The listing of the types of work tools that may be used are exemplary only and not intended to be limiting. Accordingly, it is contemplated that additional and/or different work tools than those listed may be employed without departing from the scope of the present disclosure.

In addition to linkage 111, mechanical control subsystem 170 may include components for controlling movement of linkage 111, such as, for example, actuators 119-122 and hydraulic cylinders 115-118. For example, boom 112 of linkage 111 is actuated by two hydraulic cylinders 115, 116, that, when extended and retracted, raise and lower linkage 111. Stick 113 of linkage 111 is drawn toward and outward from the vehicle by a hydraulic cylinder 117. Work tool 114 of linkage 111 is pivoted by extending and retracting hydraulic piston 118. The hydraulic flow to hydraulic cylinders 115-118 is regulated by hydraulic actuators 119-122.

Each of hydraulic actuators 119-122 is controlled by electronic control subsystem 175. Electronic control subsystem 175 may include, among other things, input devices 123, 124, a controller 130, and an implement selector switch 160. According to one exemplary embodiment, controller 130 receives first input command signals 140 indicative of an operator interaction with input devices 123, 124. In response to the received signals, controller 130 may generate second input command signals 141 for operating actuator 119-122.

According to one embodiment, input devices 123, 124 may include a first joystick 123 and a second joystick 124, mounted on each of the right and left hand side of the operator seat. The vertically mounted joysticks 123 and 124 may have two axes of movement, all in plane 150: towards the front and rear of the vehicle (shown by arrow 125) and left and right (shown by arrow 126).

Input devices 123, 124 may be electrically coupled to controller 130 via a plurality of communication lines for transmission of first input command signals 140 thereon. The horizontally mounted joystick 123 may generate one signal for each respective axis of movement, each signal representing the joystick displacement direction and velocity from neutral. Similarly, the vertically-oriented joystick 124 may generate a signal for the left-right displacement direction and velocity for implement side swing control. Input devices 123, 124 transmit the displacement and velocity signals (i.e., first input command signals 140) to controller 130 via communication lines.

Implement selector switch 160 may include one or more switches that may be physically toggled by an operator of machine 100 to selectively identify one of a plurality of work tool 114 attachments to machine 100. For example, implement selector switch 160 may be an interactive portion of a touch screen display that provides the operator with a listing of possible work tools 114 that may be attached to machine 100. The operator may select the type of work tool that is currently attached to machine 100 by pressing a corresponding selection button on the display panel.

Alternatively or additionally, implement selector switch 160 may include a system for automatically identifying and selecting which of a plurality of work tool attachments is currently attached to machine 100. For example, as an alternative or in addition to switches that can be physically toggled by an operator, implement selector 160 may include or embody an electronic tool identification sensor 161 that detects a corresponding electronic identification tag (such as an RFID tag) attached to, or embedded within, work tool 114. As such, when an electronic identification tag of a particular work tool comes within a threshold distance of tool identification sensor 161 associated with implement selector switch 160, controller 130 may identify the particular work tool as the current work tool attached to machine 100. The threshold distance by which tool identification sensor 161 can detect a work tool may be predetermined and based, at least in part, on the proximity of the electronic identification tag to tool identification sensor 161 when the work tool is attached to machine 100.

Tool identification sensor 161 may be embedded within implement selector switch 160. Alternatively or additionally, tool identification sensor 161 may be attached to stick 113 of linkage 111. According to one embodiment and as shown in FIG. 1, tool identification sensor 161 may be located toward the end of stick 113 proximate to work tool 114. Tool identification sensor 161 may be communicatively coupled to controller 130 either via communication lines (not shown) or using wireless technologies (e.g., Bluetooth).

Controller 130 may be electrically coupled to actuators 119-122. Controller 130 may be configured to process the displacement and velocity signals received by input devices 123, 124 and generate and transmit corresponding electrical signals for controlling actuators 119-122. Controller 130 may be configured to process and generate electrical control signals differently for each particular work tool that may be attached to machine 100. According to one embodiment, this process involves the transformation of the input signals received from input devices 123, 124 from a first coordinate system associated with a first work tool (e.g., bucket 114a) to a second coordinate system associated with a current work tool (e.g., forklift 114b). Processes and features associated with controller 130, will be described in further detail below.

Figure 2:
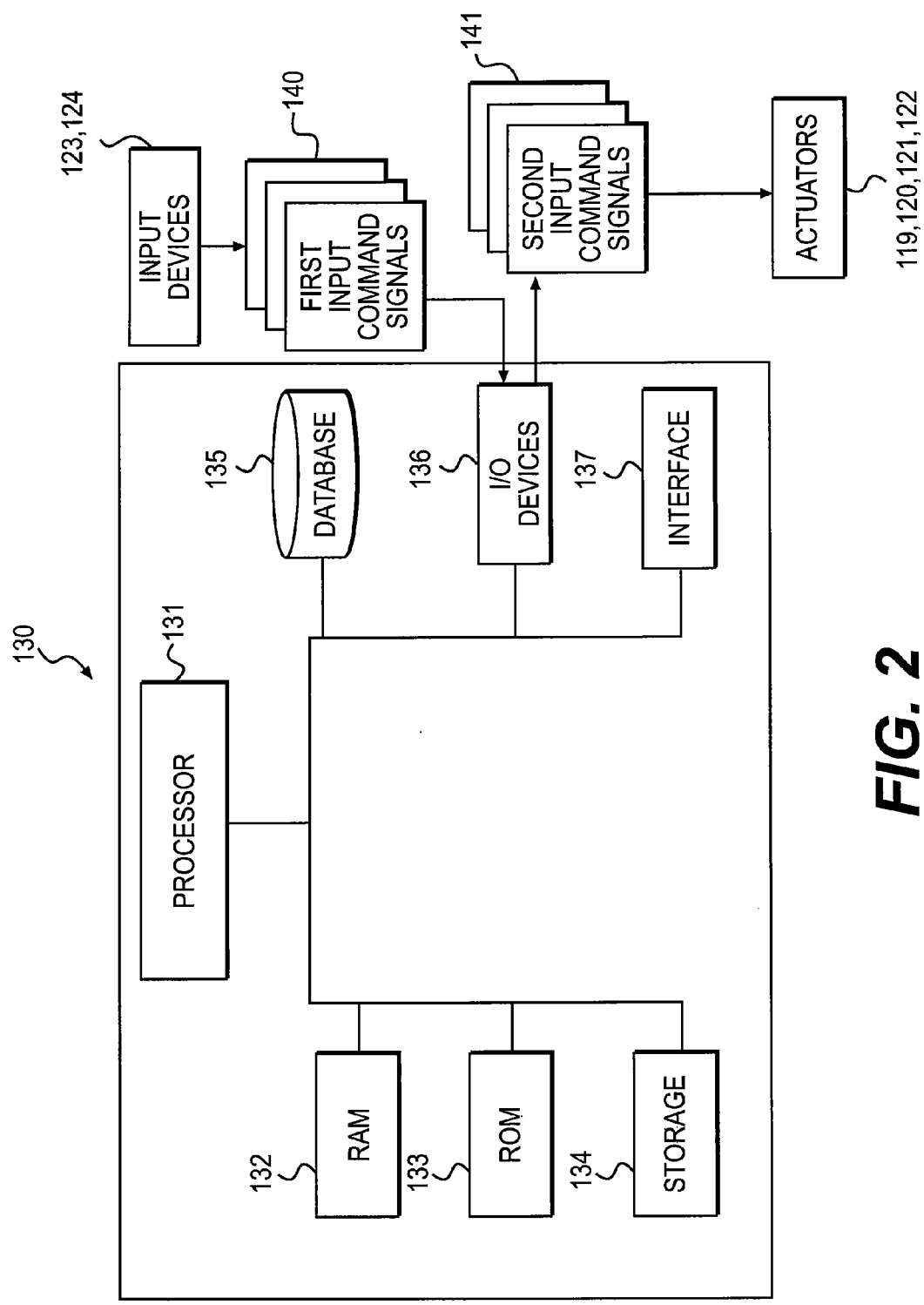
FIG. 2 provides a schematic diagram of a processor-based computer associated with an implement control module of a machine in accordance with one or more disclosed embodiments.

FIG. 2 provides a schematic diagram of a processor-based computer associated with controller 130 and certain interactions between controller 130, input devices 123, 124, and actuators 119-122. As illustrated in FIG. 2, controller 130 may include a computing system configured to receive, analyze, transmit, and/or distribute data associated with machine 100. Controller 130 may be communicatively coupled to input devices 123, 124 and configured to receive first input command signals 140 therefrom. Controller 130 may also be communicatively coupled to actuators 119-122 and configured to provide second input command signals 141 thereto. When the current work tool is the same as a first work tool, the first and second input command signals may be the same. Alternatively, the first and second command signals may be different. For example, controller 130 may read an analog electronic signal from the joysticks and convert the electronic control signal to a digital signal. The digital signal may then be passed through modulation maps (not shown) to determine a desired actuator command. An output conditioner 309 may convert the desired actuator command to a second input command, which is provided to actuators 119-122. If the current work tool is different than the first work tool, controller 130 may be configured to transform the first input command signals, such that the first input command signals are remapped to an alternate coordinate space before converting into second input command signals.

Controller 130 may include hardware and/or software components that perform processes consistent with certain disclosed embodiments. For example, as illustrated in FIG. 2, controller 130 may include one or more hardware and/or software components configured to execute software programs, such as software for monitoring and analyzing data associated with one or more machines 110. For example, controller 130 may include one or more hardware components such as, for example, processor 131, a random access memory (RAM) module 132, a read-only memory (ROM) module 133, a storage 134, a database 135, one or more input/output (I/O) devices 136, and an interface 137. Alternatively and/or additionally, controller 130 may include one or more software components such as, for example, a computer-readable medium including computer-executable instructions for performing methods consistent with certain disclosed embodiments. It is contemplated that one or more of the hardware components listed above may be implemented using software. For example, storage 134 may include a software partition associated with one or more other hardware components of controller 130. Controller 130 may include additional, fewer, and/or different components than those listed above. It is understood that the components listed above are exemplary only and not intended to be limiting.

Processor 131 may include one or more processors, each configured to execute instructions and process data to perform one or more functions associated with controller 130. As illustrated in FIG. 2, processor 131 may be communicatively coupled to RAM 132, ROM 133, storage 134, database 135, I/O devices 136, and interface 137. Processor 131 may be configured to execute sequences of computer program instructions to perform various processes, which will be described in detail below. The computer program instructions may be loaded into RAM for execution by processor 131.

RAM 132 and ROM 133 may each include one or more devices for storing information associated with an operation of controller 130 and/or processor 131. For example, ROM 133 may include a memory device configured to access and store information associated with controller 130, including information for identifying, initializing, and monitoring the operation of one or more components and subsystems of controller 130. RAM 132 may include a memory device for storing data associated with one or more operations of processor 131. For example, ROM 133 may load instructions into RAM 132 for execution by processor 131.

Storage 134 may include any type of mass storage device configured to store information that processor 131 may need to perform processes consistent with the disclosed embodiments. For example, storage 134 may include one or more magnetic and/or optical disk devices, such as hard drives, CD-ROMs, DVD-ROMs, or any other type of mass media device.

Database 135 may include one or more software and/or hardware components that cooperate to store, organize, sort, filter, and/or arrange data used by controller 130 and/or processor 131. For example, database 135 may include certain transformation parameters associated with each of a plurality of work tools that may be attached to machine 100. Such transformation parameters may include, among other things, parameters for converting a first coordinate system associated with a first work tool to a second coordinate system associated with a respective work tool. These parameters may include kinematic conversion equations that associate displacement and velocity control in a first coordinate system with displacement and velocity control in the second coordinate system. It is contemplated that database 135 may store additional and/or different information than that listed above.

I/O devices 136 may include one or more components configured to communicate information with a user associated with controller 130. For example, I/O devices may include a console with an integrated keyboard and mouse to allow a user to input parameters associated with controller 130. I/O devices 136 may also include a display including a graphical user interface (GUI) for outputting information on a monitor. I/O devices 136 may also be configured to receive input command signals from input devices 123, 124 and deliver input command signals to actuators 119-122.

Interface 137 may include one or more components configured to transmit and receive data via a communication network, such as the Internet, a local area network, a workstation peer-to-peer network, a direct link network, a wireless network, or any other suitable communication platform. For example, interface 137 may include one or more modulators, demodulators, multiplexers, demultiplexers, network communication devices, wireless devices, antennas, modems, and any other type of device configured to enable data communication via a communication network.

Figure 3:
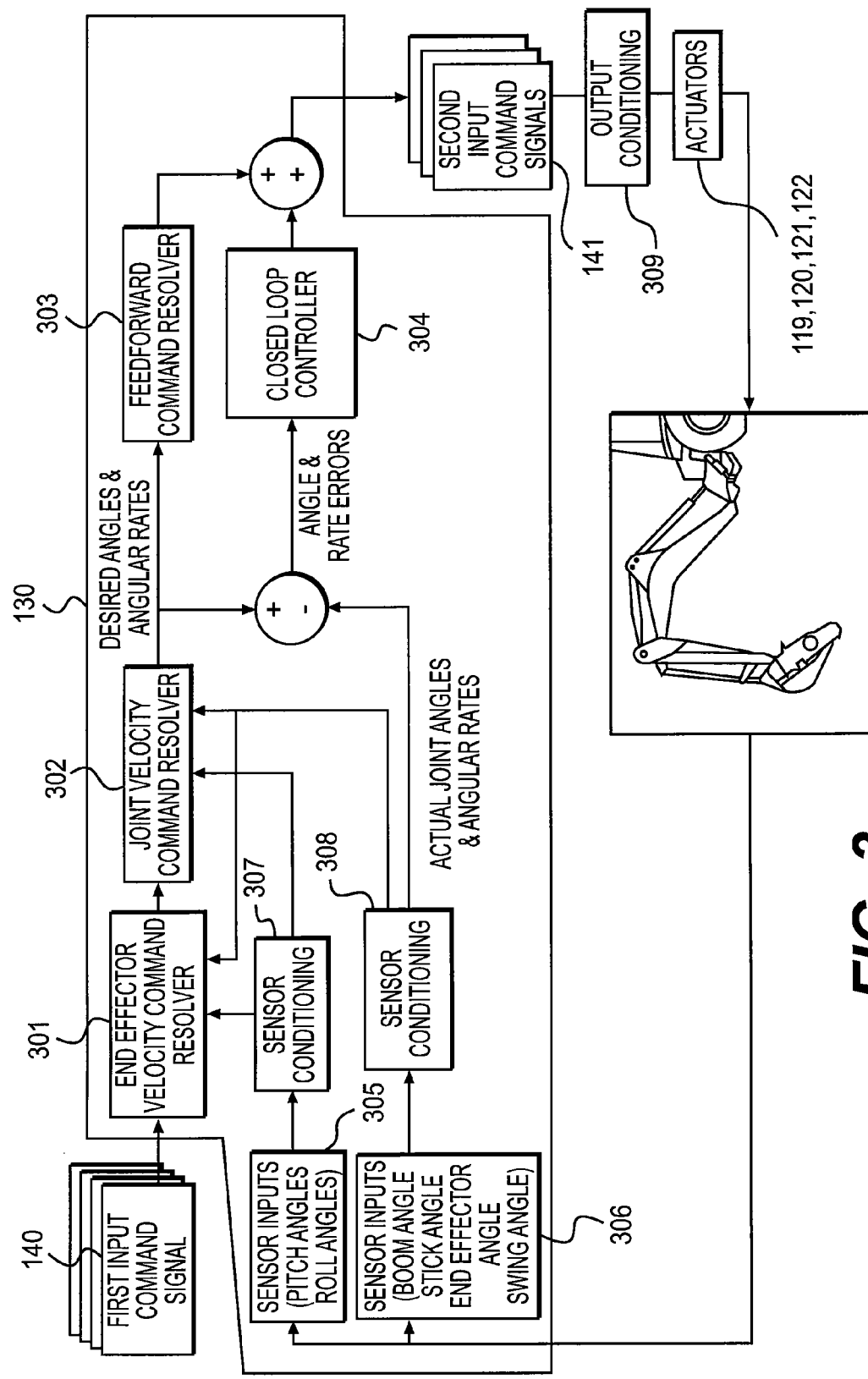
FIG. 3 provides a functional diagram of certain processes and routines for controlling movement of a machine implement, consistent with certain disclosed embodiments.

As explained, controller 130 may be configured to transform first input command signals 140 associated with a first work tool to second input command signals 141 associated with a current work tool. FIG. 3 provides a functional diagram illustrating certain processes and features associated with the transformation of first input command signals 141 to second input command signals 141.

For purposes of the present disclosure, first input command signals 140 are command signals that are referenced to a first work tool. According to one embodiment, a first work tool is any attachment where it may be desirable for each of the plurality of actuators to be independently controllable by one or more implement controllers. For example, some hydraulic excavators may be equipped with a bucket attachment as the first work tool. To provide the operator with the most flexibility to manipulate the bucket attachment, each input command signal may be designed to separately and independently control one of actuators 119-122.

In certain embodiments, however, it may be advantageous to selectively re-map the input command signals to provide different control scenarios, based on the type of work tool that is attached to the machine. For example, where it may be important to provide the operator with a capability to pivot a bucket attachment, so as to allow the loading and unloading of materials from the bucket, such a capability may not be required—or even desired—when a forklift attachment is attached to the machine. Specifically, because the base of a forklift attachment should always be oriented perpendicular to the force of gravity operating on the load to effectively support the loading and unloading of materials, it may be desirable to disable operator's capability to independently control this "pivot" capability. Rather, it may be advantageous to coordinate the control of one or more actuators to ensure that any "pivoting" of the forklift is based on maintaining the orientation of the forklift with respect to a reference orientation (e.g., perpendicular to the force of gravity, parallel to the surface of the earth, etc.) In doing so, however, processes for transforming input signals from a first coordinate space (e.g., such that each of the plurality of actuators is independently controllable by one or more input devices 123, 124) to a second coordinate space (e.g., such that at least two of the plurality of actuators are coordinated so as to maintain an orientation of a current work tool with a predetermined reference orientation) may be required.

In addition to re-mapping input command signals to maintain the orientation of a work tool with respect to a reference axis, controller 130 may also be configured to maintain trajectory of the movement of the tool through the axis. As such, a single joystick command is capable of coordinating movement of boom, stick, and fork movement to cause a work tool to move along a predefined axis. Such coordinated movement requires a command signal conversion that controls movement of all of the hydraulic cylinders in a coordinated fashion.

As explained, FIG. 3 illustrates functional processes that may be performed by controller 130. These processes may be performed by modules implemented in hardware, software, or a combination of hardware and software associated with the controller 130. As illustrated in FIG. 3, the functional process of transforming first input command signals to second input command signals begins upon receipt of first input command signals 140 by controller 130. A vector sum of X, Y, and Z coordinate control commands may be determined by a work tool velocity command resolver module 301.

This vector sum may be passed to a joint velocity command resolver module 302, which calculates desired angles and angular rates associated with the second coordinate system, based at least in part on sensor input 305 from machine orientation sensors, which measure, among other things, pitch and roll of machine 100. According to one embodiment, the sensor inputs may be conditioned by a sensor conditioning module 307, which filters the sensor input signals for noise and calculates velocities from position or angle inputs.

Based on the sensor information and a desired range of motion of the current work tool associated with machine 100, joint velocity command resolver module 302 may estimate a desired angle and/or angular velocity associated with linkage 111 and/or its constituent components. These calculations may be based, at least in part, on known kinematics-based techniques and calculations. For example, joint velocity command resolver module 302 may estimate a desired angle and angular rate associated with each of the plurality of hydraulic pistons (115-118) in order to affect a particular orientation and/or trajectory of a current work tool. This orientation and/or trajectory may be based on maintaining a desired orientation and/or trajectory associated with the current work tool. For example, in the case where the current work tool is a forklift, joint velocity command controller may determine the desired angles and/or angular velocities for ensuring that the orientation and/or trajectory of the base of the forklift remains perpendicular to the force of gravity, based on the current orientation of machine 100, and that movement along the axis maintains the desired trajectory.

After joint velocity command resolver module 302 estimates the desired angles and/or angular rates, angle and rate errors are determined by adjusting the desired angles and angular rates according to the current angles associated with linkage 111. The current linkage angles are estimated based on sensor input signals 306 received from angle sensors mounted on linkage 111. For example, linkage 111 may include a boom angle sensor, a stick angle sensor, a swing angle sensor, and a work tool sensor, each of which may provide a measurement of the location angle of the respective component. These inputs may be conditioned by a sensor condition module 308 to filter noise and perform velocity calculations. These velocity calculations are based on the joint position measurements from position sensors mounted on linkages 111. The angle and/or angular rate errors are calculated as the difference between the desired angles and/or angular rates and the actual joint angles and angular rates.

Once calculated, the angle and/or angular rate errors are fed into a closed loop controller module 304. Closed loop controller module 304 may provide a corrective valve input command to account for effects of the actual loads and forces acting on linkage 111.

Additionally, the desired angles and angular rates calculated by joint velocity command resolver module 302 are fed into feed-forward command resolver module 303. Feed-forward command resolver module 303 generates valve commands based on the desired angles and/or angular rates associated with linkage 111. The valve commands output from feed-forward command resolver module 303 are then combined with corrective command signals output from closed loop controller 304 to generate second input command signals 141.

Controller 130 may provide second input command signals 141 to actuators 119-122 which, in turn, regulate the flow of fluid to hydraulic pistons 115-118 for controlling movement of linkage 111. According to one embodiment, controller 130 may periodically and/or continuously monitor sensor signals associated with linkage 111 and/or machine 100. For example, pitch/roll sensor input module 305 of controller 130 may monitor pitch and roll sensors mounted on machine. Alternatively or additionally, sensor input module 306 may monitor one or more sensors mounted to linkage 111, such as a boom angle sensor, a stick angle sensor, a swing angle sensor, and a work tool sensor. As explained previously and as illustrated in FIG. 3, controller 130 may use these sensor signals as part of either a feed-forward command loop or a feedback command loop to generate second input command signals 141.

Figure 4:
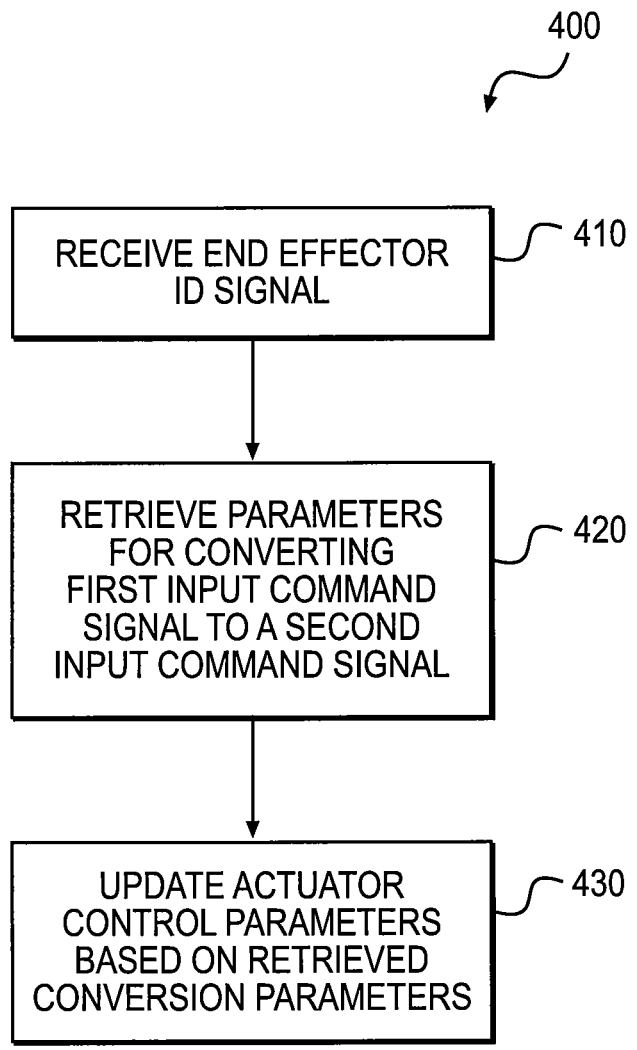
FIG. 4 provides a flowchart depicting an exemplary method for remapping machine controls, consistent with certain disclosed embodiments.
Figure 5:
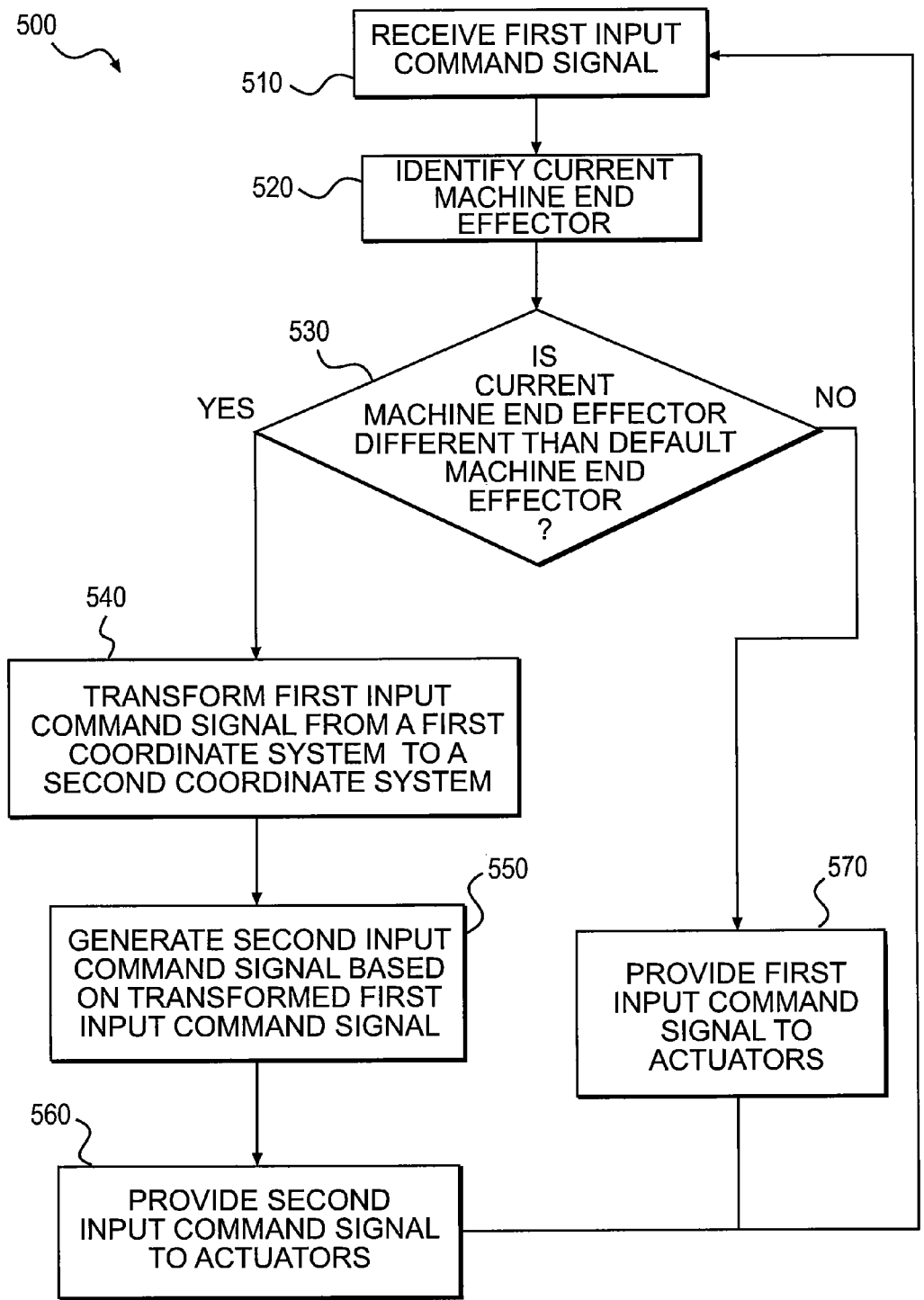
FIG. 5 provides a flowchart depicting another exemplary method for selectively remapping implement control commands in a machine, in accordance with one or more disclosed embodiments.

As explained, processes and features consistent with the disclosed embodiments provide a system and method for transforming an operator's implement control commands from a first coordinate system associated with controlling a first work tool to a second coordinate system associated with a current work tool. The first coordinate system may be defined so as to allow the operator of the machine to independently control each of the hydraulic pistons associated with adjusting boom angle, stick angle, swing angle, and work tool "pivot" angle. In contrast, the second coordinate system may be defined so as to coordinate control of two or more of the hydraulic pistons so as to maintain a particular orientation and/or trajectory of the work tool with respect to a reference orientation. By providing a system for transforming operator input commands based on a desired work tool manipulation strategy, operators may more effectively and quickly control certain specialized work tools and tools that rely on maintaining the position of the work tool with respect to a reference orientation. FIGS. 4 and 5 provide exemplary flowcharts 400 and 500 that illustrated methods for selectively transforming or remapping operator input commands based on the current work tool attached to machine 100.

FIG. 4 provides flowchart 400 that depicts an exemplary computer-implemented method for retrieving parameters for converting a first input command signal to a second input command signal. As illustrated in FIG. 4, the process may commence upon receipt of an implement ID signal by processor 131 of controller 130 (Step 410). According to one embodiment, implement ID signal may be received from an implement selector switch 160 that may be communicatively coupled to controller 130. This signal may be generated, for example, in response to an operator interaction with a touch-screen display to select a particular work tool from among a list of possible work tools. Alternatively or additionally, the signal may be automatically generated when an electronic identification tag of a particular work tool comes within a threshold distance of the electronic sensor associated with implement selector switch 160.

Upon receipt of implement ID signal, processor 131 may be configured to retrieve parameters for converting first input command signals to second input command signals (Step 420). For example, processor 131 may access database 135 and retrieve specific inverse kinematic parameters, reference orientation definitions, parameters for converting a first coordinate system associated with a first work tool to a second coordinate system associated with the selected work tool, and/or other parameters for controlling the selected work tool in a desired manner.

Once retrieved, processor 131 of controller 130 may update the parameters for controlling the plurality of actuators based on the retrieved conversion parameters (Step 430). According to one embodiment, this process involved updating the parameters associated with joint velocity command resolver module 302 with the retrieved parameters.

FIG. 5 provides a flowchart 500 depicting an exemplary method for transforming a first input command signal associated with controlling linkage 111 and/or work tool into a second input command signal associated with controlling linkage 111 and/or work tool. As explained, first input command signal may be associated with controlling linkage 111 and/or work tool 114 in a first coordinate space for controlling a default working implement such that each of the plurality of actuators is independently controllable by one or more implement controllers. In cases where the current work tool is different than the first work tool, processes and methods consistent with the disclosed embodiments transform the first input command signal into a second input command signal for controlling the current work tool such that less than each of the plurality of actuators is independently controllable by the one or more implement controllers. In particular, the second input command signal may coordinate control of multiple actuators together, in order to maintain an orientation and trajectory of the current work tool with respect to a reference orientation.

The process depicted in flowchart 500 of FIG. 5 may commence upon receipt of a first input command signal (Step 510). For example, processor 131 of controller 130 may receive first input command signals generated by operator interaction with input devices 123, 124. According to one embodiment, processor 131 may calculate a vector sum of the received inputs.

Before the received first input control signals are processed further, controller 131 may identify the current work tool attached to machine 100 (Step 520). According to one embodiment, controller 130 may identify the current work tool in response to a work tool identification signal generated by implement selector switch 160 in response to a toggling of a specific selector button by an operator. Alternatively or additionally, controller 130 may identify the current work tool based on a detection signal received from tool identification sensor 161 that automatically detects the current work tool based on an electronic sensor embedded within (or mounted on) the current work tool.

Once the current work tool has been identified, the current work tool is compared with the first work tool to determine whether a transformation of the first input control signals needs to be performed (Step 530). According to one embodiment, the "default" work tool may be specified as a particular work tool (e.g., a bucket). Alternatively or additionally, the "default" work tool may be defined by a default control strategy. For instance, the first work tool may simply be defined such that each displacement and velocity parameter detected by an input device corresponds to a particular displacement and velocity command for a particular actuator 119-122. According to this embodiment, each input command may be "mapped" to independently control movement of one of boom, stick, swing, and/or work tool.

If the current work tool is not different than the first work tool (Step 530: No), controller 130 may provide first input command signals to actuators 119-122 (Step 570). According to one embodiment, controller 130 may simply pass the received first input command signals directly to actuators 119-122.

If the current work tool is different than the first work tool (Step 530: Yes), controller 130 may transform the first input command signals associated with a control space into second input command signals associated with a second control space (Step 540). According to one exemplary embodiment, the first control space may include any coordinate system (e.g., a cylinder control space) that allows for independent control of each of boom 112, stick 113, swing angle, and work tool orientation.

Second coordinate system, on the other hand, may include a control space that is defined based on a specific reference feature or coordinate system associated with a particular work tool. For example, in certain situations, it may be advantageous to maintain an orientation and/or trajectory of a particular work tool in order to more effectively perform a particular task. To do so, predetermined kinematic parameters may be specified to coordinate control of a plurality of work tools according to a predetermined reference orientation based on the specific task associated with the work tool.

For example, an auger attachment 114*d* may be used to drill cylindrical holes in a surface for setting posts, poles, or support beams. Often, these poles must placed in a precise orientation (e.g., perpendicular) with respect to the surface into which they will be inserted. As such, it may be advantageous to ensure that the tip of the auger bit maintains precisely the same orientation angle and follows a perpendicular trajectory with respect to the surface, particularly as the bit is inserted and retracted from the hole. Thus, it may be advantageous to coordinate movement of linkage 111 in response to operator control inputs to maintain this orientation and trajectory of the auger.

Once the first input command signals have been transformed into second input command signals, controller 130 may generate second input command signals (Step 550) and provide the second input command signals to one or more of actuators 119-122 (Step 560). According to one exemplary embodiment, the process described in flowchart 500 may be repeated, as necessary, for each set of input command signals provided by input devices 124, 125.

INDUSTRIAL APPLICABILITY

Systems and methods consistent with the disclosed embodiments provide a solution for remapping input controller commands that allows machine operators to quickly and effectively switch between schemes for controlling linkage 111. According to one embodiment, the systems and methods described herein allow an operator to choose a default control scheme that allows independent control of all of the actuators associated with linkage 111, so as to provide operator control of linkage 111 in a first control space. The systems and methods described herein also allow an operator choose a different control scheme that coordinates control of two or more actuators associated with linkage 111, so as to provide operator control of linkage 111 is a second control space. The systems and methods described herein may be particularly advantageous for machines that require the flexibility to support a number of different attachments.

Although certain exemplary embodiments disclosed herein are described in connection with specific types of work tools and/or machines, they may be applicable to any situation where it may be advantageous to selectively implement different schemes for controlling hydraulically-actuated implements based on the specific functionality of a tool attachment. Indeed, the presently disclosed systems and methods may be implemented in a variety of machines that use hydraulic actuators to control movement of tool attachments.

The presently disclosed systems and methods for selectively remapping machine implement controls may have several advantages. For example, the presently disclosed systems and methods allow an operator the flexibility to toggle between control schemes that provide independent control of each hydraulic actuator and control schemes that coordinate control of two or more hydraulic actuators together based on a desired behavior of the tool. By providing the operator with an option to coordinate the response of the operator joysticks to match a coordinate system of a particular tool, the operator may more quickly, easily, and efficiently manipulate the machine based on the type of tool attached to the machine, particularly when compared with systems that provide only one input control scheme.

In addition, the presently disclosed system and methods may have significant cost benefits. For instance, because the input control parameters may be adjusted to provide a control scheme that is logically coordinated with the natural features of a tool (e.g., a reference axis of the tool), operator training costs may be reduced. Specifically, because certain tools (e.g., a forklift attachment) require maintaining a particular orientation and trajectory of the tool with respect to a reference orientation (e.g., a force of gravity), costs associated with providing the operator with specialized training to re-learn how the default input control responses map to the axes of the particular tool may be reduced.

It will be apparent to those skilled in the art that various modifications and variations can be made to the disclosed systems and methods for selectively remapping implement control commands in a machine without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for selectively remapping implement control commands in a machine, comprising:
   receiving, by a processor, a first input command signal for controlling a plurality of actuators associated with the machine, the first input command signal associated with controlling a first work tool such that each of the plurality of actuators is independently controllable by one or more implement controllers;
   identifying, by the processor, a current work tool attached to the machine;
   determining, by the processor, whether the current work tool is different from a first work tool;
   wherein if the current work tool is different from the first work tool:
      transforming, by the processor, the first input command signal into a second input command signal associated with the current work tool, the second input command signal associated with controlling the current work tool such that less than each of the plurality of actuators is independently controllable by the one or more implement controllers;
      providing, by the processor, the second input command signal to one or more of the plurality of actuators of the machine; and
   wherein if the current work tool is not different from the first work tool, providing the first input command signal to one or more of the plurality of actuators of the machine.

2. The method of claim 1, wherein the machine includes a hydraulic excavator and each of the plurality of actuators includes a hydraulic piston.

3. The method of claim 1, wherein transforming the first input command signal into the second input command signal further includes:
   establishing a reference axis associated with the identified current work tool;
   monitoring an orientation of the identified current work tool;
   adjusting the second input command signal so as to maintain the orientation and trajectory of the current work tool relative to the reference axis.

4. The method of claim 3, wherein the reference axis corresponds to a dimensional feature of the current work tool.

5. The method of claim 3, wherein the reference axis is associated with a direction of a gravitational force operating on the current work tool.

6. The method of claim 3, further comprising:
   detecting at least one of a pitch of the machine or a roll of the machine; and
   adjusting the second input command signal based at least in part on the detected at least one of the pitch and roll of the machine.

7. The method of claim 1, wherein identifying the current work tool includes detecting, by a tool identification sensor, the current work tool when the current work tool is within a threshold distance of the tool identification sensor.

8. The method of claim 1, wherein identifying the current work tool includes determining a selection status of a selector switch associated with the current work tool.

9. A method for selectively remapping implement control commands in a machine, comprising:
   receiving an identification signal for identifying a current work tool attached to the machine;
   retrieving, from an on-board memory location, parameters for converting a first input command signal for controlling a plurality of actuators associated with the machine to a second input command signal for controlling the plurality of actuators, wherein the first input command signal is associated with controlling a first work tool such that each of the plurality of actuators is independently controllable by one or more implement controllers and the second input command signal is associated with controlling the current work tool such that less than each of the plurality of actuators is independently controllable by the one or more implement controllers, wherein the retrieved parameters includes an error correction parameter that adjusts the second input command signal based on an orientation of the current work tool with respect to a reference orientation;
   updating, in memory associated with an implement controller, parameters for controlling the plurality of actuators based on the retrieved conversion parameters.

10. The method of claim 9, wherein the machine includes a hydraulic excavator and each of the plurality of actuators includes a hydraulic piston.

11. The method of claim 9, wherein the parameters for converting the first input command signal to the second input command signal further includes parameters for coordinating control of at least two of the plurality of actuators so as to substantially maintain an orientation and trajectory of the current work tool with respect to the reference orientation.

12. The method of claim 11, wherein the reference orientation and trajectory corresponds to a dimensional axis of the current work tool.

13. The method of claim 11, wherein the reference orientation and trajectory are associated with a direction of gravitational force operating on the current work tool.

14. The method of claim 9, wherein receiving the identification signal includes detecting, by a work tool sensor, the current work tool when the current work tool is within a threshold distance of the work tool sensor.

15. The method of claim 9, wherein receiving the identification signal includes determining a current selection status of a selector switch associated with the current work tool.

16. A system for controlling a work tool associated with a machine, the system comprising:
   one or more actuators operatively coupled to the machine and configured to control movement associated with at least a portion of the machine;
   a controller configured to receive a first input command signal for controlling the one or more actuators in a first coordinate system;
   a processor communicatively coupled to the controller and configured to:
      receive an identification signal associated with a current work tool attached to the machine;
      determine whether the current work tool is different from a first work tool;
      wherein if the current work tool is different from the first work tool, the processor is further configured to:

transform the first input command signal into a second input command signal associated with the current work tool, the second input command signal associated with controlling the current work tool such that less than each of the plurality of actuators is independently controllable by the one or more implement controllers;

provide the second input command signal to one or more of the plurality of actuators of the machine; and wherein if the current work tool is not different from the first work tool, the processor is further configured to provide the first input command signal to one or more of the plurality of actuators of the machine.

17. The system of claim 16, further including a selector switch communicatively coupled to the processor and configured to:

generate an identification signal associated with the current work tool; and transmit the identification signal to the processor.

18. The system of claim 17, wherein the selector switch is further configured to:

detect when the current work tool is within a threshold distance of a tool identification sensor; and generate the identification signal in response to the detection.

19. The system of claim 16, wherein the processor is further configured to:

establish a reference axis associated with the identified current work tool;

monitor an orientation and trajectory of the identified current work tool; and adjust the second input command signal so as to maintain the orientation and trajectory of the current work tool relative to the reference axis.

20. The system of claim 16, wherein the processor is further configured to:

receive at least one of a pitch of the machine or a roll of the machine; and adjust the second input command signal based at least in part on the detected at least one of the pitch and roll of the machine.

* * * * *